C. J. LENSVELT.
MEAT SLICING MACHINE.
APPLICATION FILED JUNE 19, 1909.

944,797.

Patented Dec. 28, 1909.

Witnesses:
P. F. Nagle.
L. Douville.

Inventor:
By Cornelis J. Lensvelt.
Wiedersheim & Fairbanks.
Attorneys.

UNITED STATES PATENT OFFICE.

CORNELIS JOB LENSVELT, OF ZURICH, SWITZERLAND.

MEAT-SLICING MACHINE.

944,797.  Specification of Letters Patent.  Patented Dec. 28, 1909.

Application filed June 19, 1909. Serial No. 503,059.

*To all whom it may concern:*

Be it known that I, CORNELIS JOB LENSVELT, residing at Zurich, Switzerland, a subject of the Queen of the Netherlands, have invented certain new and useful Improvements Connected with Meat-Slicing Machines, of which the following is a specification.

This invention relates to meat slicing machines and it has for its object to provide the meat clamp with an improved spring arrangement for retaining the front upright rack in position and means are also provided whereby the meat plate is prevented from jumping out of position when the machine is being used for cutting hard meat, gristle, small bones, etc.

In order that the invention may be clearly understood I have hereunto appended an explanatory sheet of drawings, whereon:—

Figure 1:
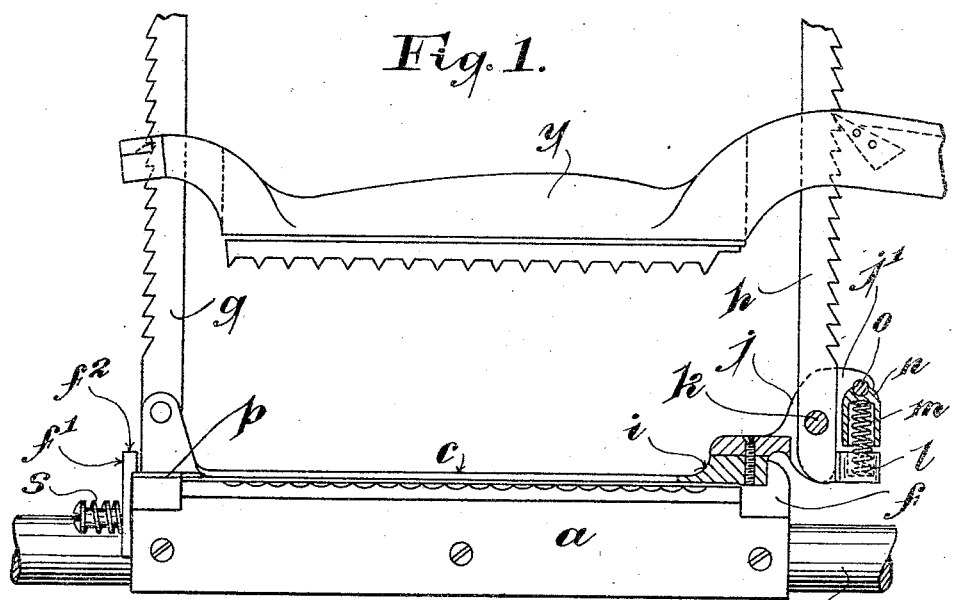
Figure 2:
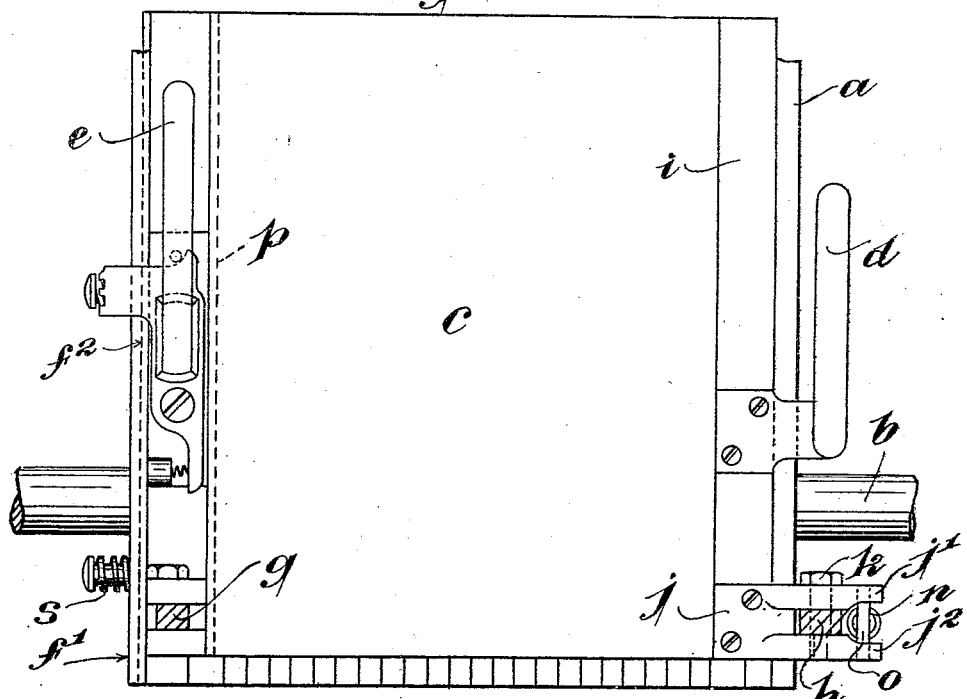

Figure 1 is an end elevation of a reciprocating meat table with its meat clamp and sliding plate. Fig. 2 is a plan.

$a$ is the reciprocating meat table. $b$ one of the bars upon which the table reciprocates. $c$ the sliding meat plate with its handles $d$, $e$. $f$, $f^1$, are the usual guides for the meat plate.

$g$ is the one upright and $h$ the other upright of the meat clamp.

$y$ is the usual serrated cross bar of the clamp.

Under my invention I provide the side rail or part $i$ of the meat plate with a bracket $j$ which overhangs the side of the meat table and is provided with two jaws $j^1$, $j^2$, between which the upright $h$ is secured by a pin $k$. The lower end of the upright $h$ is bent outwardly at right angles and is made with a socket $l$ in which is fitted a spiral spring $m$ the said spiral spring fitting into a swiveling cap $n$ carried by a pin $o$ which pin is secured in the upper overhanging parts of the jaws. I provide the opposite side of the meat plate, at the underside thereof, with a thin flat metal bar $p$ which projects slightly beyond the meat plate and is held by the overhanging upper edge $f^2$ of the guide $f^1$ which, as usual, is pressed on by springs one of which is shown at $s$. As the bar $p$ is held by the part $f^2$ of the guide $f^1$ the meat plate $c$ cannot rise or jump up out of place at the left hand side (Fig. 1) as sometimes happens when the knife is cutting hard parts of the meat. Although the plate $c$ is thus held against rising up at the left hand side thereof its removal from between the guides $f$, $f^1$, by the handles $d$, $e$, is not prevented.

With the improved spring arrangement for retaining the front upright $h$ in position the spring is outside of the meat clamp and provides a better opening for the meat to pass through and it is also not liable to be clogged with dirt and grease especially as it is covered by the cap $n$.

As will be readily understood the metal strip $p$ retains the sliding meat plate $c$ in position and prevents it jumping out of place when the knife is cutting hard meat, gristle, small bones, etc.

Having now fully described my invention what I claim and desire to secure by Letters Patent is:—

1. A meat clamp for tables of meat slicing machines having an upright with laterally projecting extension, a bracket secured to the meat table so as to overhang the same for carrying the upright and resilient means disposed between the end of the bracket and the extension of the upright.

2. A meat clamp having an upright with lateral extension carrying a socket, a bracket for supporting the upright, which bracket is made with an overhanging extension and resilient means disposed between the socket and the extension.

3. A meat clamp having an upright with a socket at its lower end, a bracket in which the upright is pivoted and which is made with an extension, a cap carried by the extension and a spring whose one end is disposed within the cap and the other end disposed within the socket.

4. A meat clamp having an upright with a socket at its lower end and parallel therewith in an extension at right angles thereto, a forked bracket in which the upright is pivoted, a swiveling cap carried by the bracket and a spring disposed at one end in the swiveling cap and at its other end in the socket of the upright.

In testimony whereof I affix my signature in presence of two witnesses.

CORNELIS JOB LENSVELT.

Witnesses:
 HANS HAUS,
 CARL ZUBLER.